UNITED STATES PATENT OFFICE.

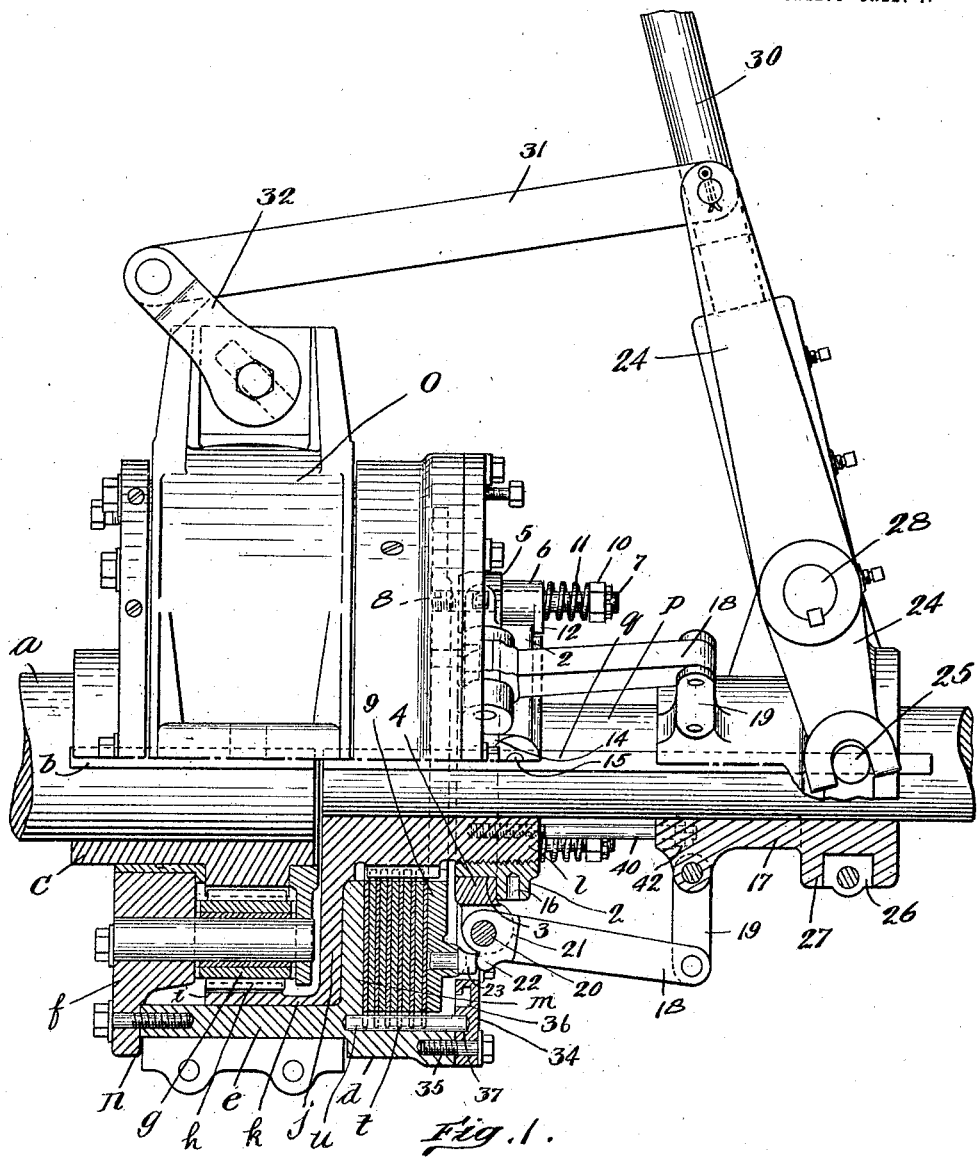

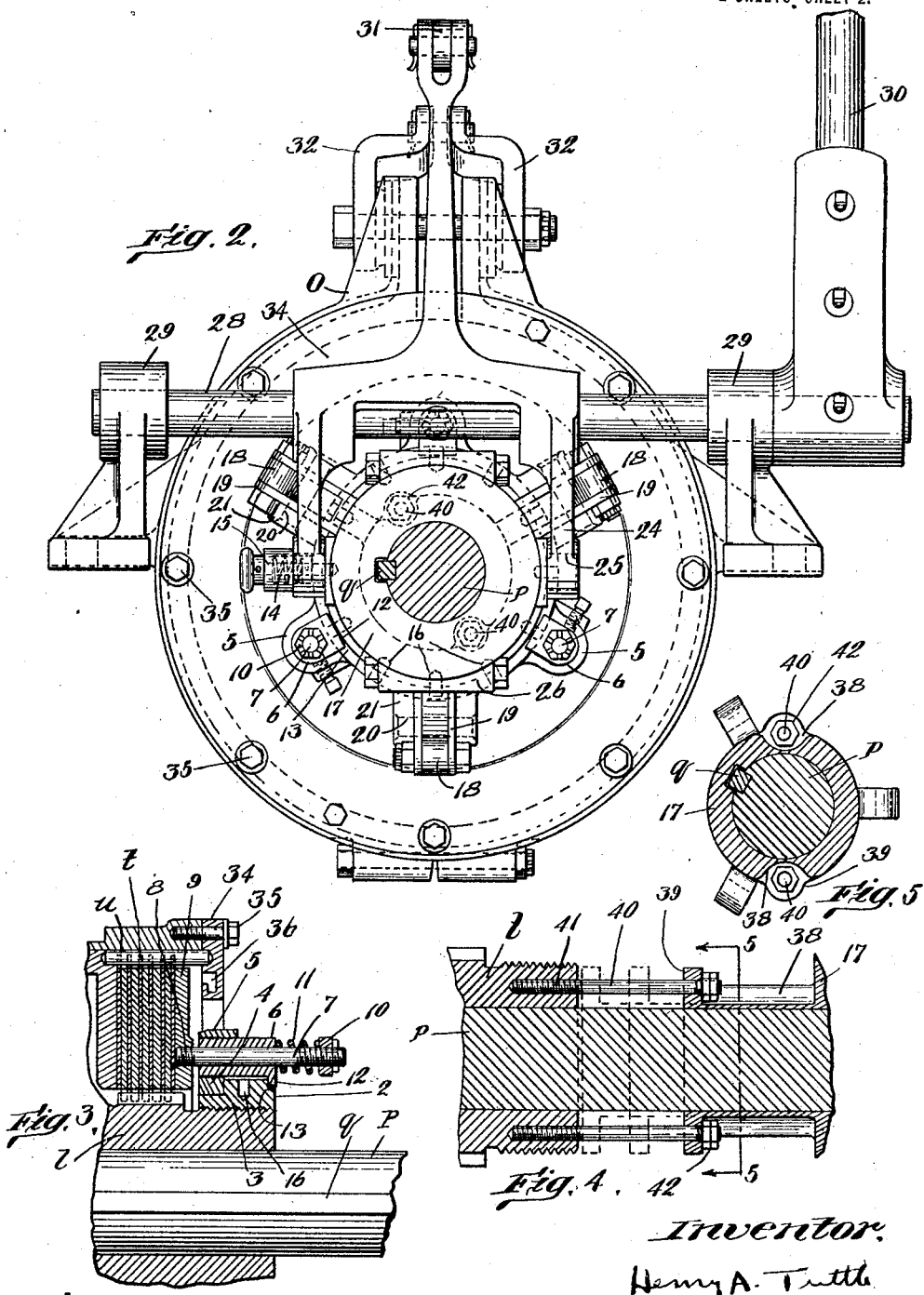

HENRY A. TUTTLE, OF TAUNTON, MASSACHUSETTS.

REVERSING-GEARING.

1,392,982.  Specification of Letters Patent.  Patented Oct. 11, 1921.

Application filed June 18, 1917. Serial No. 175,268.

*To all whom it may concern:*

Be it known that I, HENRY A. TUTTLE, a citizen of the United States, residing at Taunton, in the county of Bristol and State of Massachusetts, have invented an Improvement in Reversing-Gearing, of which the following is a specification.

This invention relates to reverse gearing of the type illustrated generally in Letters Patent #1,169,762 and #1,168,764, dated January 18, 1916, and 1,221,113, dated April 3, 1917, and is intended as an improvement on the same, as well as on other reverse-gearing for which the improvements may be adapted.

Certain features of this invention are also disclosed in my co-pending applications, Serial No. 176,673, filed June 25, 1917; Serial No. 274,247, filed Jan. 31, 1919; Serial No. 339,108, filed Nov. 19, 1919; Serial No. 344,532, filed Dec. 13, 1919.

The reversing-gearing of said patents, in its essential details with reference to the present invention, consists of a driving-shaft, a driven-shaft, gearing connecting said shafts including brake-mechanism to secure reverse drive, and a clutch-mechanism to secure forward drive, having an axially movable clutch-operating member with actuating-means for said operating member and for said brake-mechanism, the actuating-means being movable in one direction from neutral to actuate the clutch-operating member, and thereby the clutch for forward drive, and in the opposite direction from neutral to set the brake and cause reverse drive.

In the aforesaid structures, the actuating-means for the clutch-operating member, which comprises a thrust sleeve and link and lever mechanism intermediate the sleeve and clutch-operating member, is connected with the case, and by reason of such connection will remain at rest when the actuating-means is in position to set the brake and secure reverse drive; while in neutral position, such parts will rotate. As the sleeve of the actuating-means is mounted on the propeller shaft, and is free; the relative rotation of these parts, with the actuating-means in neutral position and reverse drive, produces friction between the sleeve and propeller-shaft, as well as between the sleeve and the means connected therewith for shifting the same.

It is an object of the present invention to avoid this friction and such object may be attained by providing a structure in which the clutch-operating member is carried by or connected with the same element to which the actuating-means is connected, and by mounting the sleeve of the actuating-means on the propeller shaft for longitudinal or axial movement, but fixed against independent rotary movement with respect thereto. As for instance, both the clutch-operating member and the actuating-mechanism may be connected with the annular or internal gear-member. In this arrangement the clutch-operating member, as well as the actuating-mechanism, will remain at rest when the gearing is in neutral position, and will rotate with the propeller shaft, when the gearing is in reverse position, hence independent movement of these parts, existing in the prior types referred to, and resulting in the friction also referred to, is avoided.

The present invention has for another object the provision of improved means for limiting the movement of the actuating-means in that direction necessary to set the clutch-mechanism beyond a point necessary for a proper engaging relation of the clutch-members, whereby the possibility of moving the actuating-means in a forward drive position to a point beyond such proper engagement of the clutch-plates is prevented. The limiting-means of the present invention will, therefore, insure against possibility of an excessive movement of the actuating-means, and will avoid other than a proper contacting pressure between the clutch-plates, the limiting means being, however, preferably made adjustable, in order that the desired maximum pressure between the clutch-members, due to the operation of the actuating-means, may be predetermined.

In the drawings,

Figure 1 is a view in elevation, partly in section, of one form of reversing-gear, and illustrating the application thereto of the improvements forming this invention.

Fig. 2 is a rear end elevation of the same.

Fig. 3 is an enlarged broken sectional view illustrating the connections and support for the clutch-operating member.

Fig. 4 is a broken sectional view illustrating particularly the limiting-means for the movement of the sleeve element of the actuating-means in one direction.

Fig. 5 is a section on line 5—5 of Fig. 4.

The reversing-gear shown is of a type with which the present improvements are particularly coöperative, and for the purposes of the present invention, may be generally described as follows:—

The driving-shaft $a$ has secured thereto, by a key $b$, a spur-gear $c$. A case $d$ is arranged to inclose the parts, the annular wall $e$ of which is provided with a removable end-wall $f$, having an annular opening to rotatably receive the hub of the spur-gear. The wall $f$ of the case supports a series of pinions $g$, having engagements with the spur-gear. The pinions $g$ are also engaged by the teeth $h$ of an internal gear $i$, which is extended as at $k$, beyond said pinions and has an annular disk-like wall $j$, the outer cylindrical surface of said internal gear bearing against the inner surface of the annular wall of the case. The inner peripheral edge of the wall $j$ is integrally and axially projected in the form of a hub $l$.

The case $d$ is interiorly provided with an annular wall $m$, which is rotatably engaged by and bears against the annular wall $j$ of the internal gear, while the outer surface of the case, in line with the pinions, is cut out at $n$, for the reception of the brake-mechanism $o$ of which no particular description is necessary. The hub $l$ of the annular gear is secured upon the propeller-shaft $p$, by a key $q$, and this hub, for the purpose of the present invention, is made comparatively long. The chamber for the clutch-members is arranged at one side of the annular wall $m$ in the case, such wall $m$ constituting one end of the clutch-plate chamber. The clutch plates are arranged in this chamber and adapted in clutching operation to be brought into such pressure contact as to secure their frictional enagement, the alternate plates having inner peripheral teeth to engage the teeth as formed on the hub $l$, the remaining plates having teeth or projections $t$, on their outer peripheral edge to engage pins $u$, mounted in the annular wall $m$ of the case, and in a removable wall to be later described.

In providing for a structure, whereby the clutch-operating member and actuating-means therefor will remain at rest when the parts are in neutral position, it is apparent that such parts may be supported from the hub of the annular gear, and in carrying out this feature, that portion of the hub which extends beyond the teeth, is exteriorly threaded to receive an adjustable collar 2, that edge of the collar next the clutch-plate chamber being annularly reduced at 3 to rotatably receive a ring 4. The ring 4, which is of greater diameter than the collar 2, is formed at determinate points with bosses 5, having holes through them which extend axially to the inner face of the ring and secured in said holes, removably, if desired, are sleeves 6, in which are slidably mounted pins 7. The relative inner ends of the pins are threaded at 8, see Fig. 3, and engage with threaded openings in the clutch-operating member or plate 9, which latter is of a size to effectively coöperate with and bear upon the outermost clutch-plate. The outer ends of the pins are threaded for the reception of nuts 10, and between the nuts and proximate ends of the sleeve 6 are arranged coiled springs 11, which serve to normally move said pins outwardly with respect to the cluch-plates, thereby to hold the clutch-operating member 9 in retracted or unclutching position. To prevent axial movement of the ring 4, under an excessive movement of the actuating means, in reverse-drive movement, which might operate the plate 9 to set the clutch plates, the sleeves 6 are formed with lateral projections 12, designed to engage recesses 13, formed in the outer edge of the collar 2, so that the ring 4 is thus held against independent movement axially of the collar.

The clutch-operating member 9 is thus carried by the hub of the internal gear, and by reason of the threaded connection of the collar with said hub, said clutch-operating member may be adjusted for varying the clutching pressure. This adjustment is secured by rotation of the collar 2, on the hub, the threads permitting relatively inward or outward movement of said collar in such turning position. To secure the collar in fixed relation to the hub, following desired positioning of ring 4, there is provided a housing 14, offset from said ring, in which is arranged a spring-pressed pin 15, operable from beyond the housing and having its inner end adapted to engage any one of a series of recesses 16 formed in the collar.

The actuating-means for the clutch operating-member 9 will now be described. A thrust sleeve 17 is secured upon the propeller-shaft against other than longitudinal or axial movement, preferably by the aforesaid key $q$. See Fig. 1. Operating levers 18 are terminally connected by links 19 with the sleeve, and at their opposite ends are pivotally supported, at 20, between ears 21, projecting from the ring 4. The levers 18, adjacent the pivotal connections 20, are formed with radial lugs or toes 22, which are positioned to bear upon the heads of pins 23, removably secured in and projecting beyond the proximate surface of the clutch operating-member or plate 9. The springs 11 also serve to hold the clutch operating-member 9 in engagement with the lugs or toes 22 of the levers 18. The sleeve 17 is adapted for operation, to secure the desired action of the reversing-gear, by shifting mechanism including a yoke lever 24, engaging diametrically opposite pins 25 of a collar 26, freely rotatable in an annular recess 27, formed in or on said sleeve, the lever being keyed upon a bearing 28, mounted in fixed bearings 29, and operated through the handle 30 keyed upon the shaft. The lever 24 is connected at its upper end through a bar 31 to a link 32, for the brake-mechanism o, it being understood that in the operation of the lever to set the parts for reverse drive, link 32 will be operated to set the brake; while in other positions of the actuating-lever the brake will be free.

The end of the case immediately beyond the clutch-operating member or plate 9 is partly closed by a wall 34, in the form of an annular member removably secured to the end of the wall of the case by bolts 35. The inner peripheral edge of the removable wall 34 is just beyond the operating plane of the lugs or toes 22, of the clutching levers 18, and in this wall and opening through the inner surface, or that surface next the clutch plate chamber, there is formed an annular undercut channel 36, to receive oil for lubricating the clutch-plates. The formation of this oil pocket is such that rotative action of the parts will not cause the oil to be forced therefrom, but will permit a gradual escape of oil for lubrication until the supply is exhausted. The wall 34 is formed with openings 37, at appropriate intervals to receive the outer ends of pins $u$, which form the engaging member of the case for certain of the clutch-plates.

The thrust 17 is formed with a series of circumferentially alined recesses 38, see Figs. 4 and 5, and through the walls 39, formed thereby and next the clutch-mechanism proper are extended limiting bolts 40. The ends of the bolts remote from the sleeve are threaded at 41 to engage suitably threaded openings in the end of the hub of the internal-gear, while the ends of the bolts within the recesses 38 are threaded for the reception of nuts 42, which nuts serve to limit movement of the sleeve in one direction relative to the hub, the use of the nuts permitting an obvious adjustment of such limitation. The sleeve in its operation to set the clutch for forward drive is moved from neutral away from the clutching-mechanism, and oppositely or toward the clutching-mechanism from neutral for reverse drive. The recesses 38 will, therefore, be of a length to permit the full necessary movement of the sleeve.

I claim:—

1. In a reverse gearing, a driving-shaft, a driven-shaft, gearing connecting said shafts including an internal gear and a brake-mechanism to secure reverse drive, clutch-mechanism to secure forward drive including clutch-plates and a clutch operating-member, said plates and operating-member arranged for axial movement on the hub of the internal gear, actuating means for said operating-member, link and lever mechanism connecting said clutch-operating member and actuating-means, means constraining said clutch operating-member and actuating-means for simultaneous rotation upon a reverse drive.

2. In a reverse gearing, a driving-shaft, a driven-shaft, gearing connecting said shafts including an internal gear and a brake-mechanism to secure reverse drive, and clutch-mechanism to secure forward drive including clutch-plates and a clutch operating-member, said plates and operating member arranged for axial movement on the hub of the interial gear, actuating-means for said operating-member, link and lever mechanism connecting said clutch-operating member and actuating-means, said clutch operating-member and actuating means being adapted to remain at rest when the reverse gearing is in neutral, inoperative position.

3. In a reversing gearing, a driving shaft, a driven shaft, gearing connecting said shafts including an internal gear and a brake-mechanism to secure reverse drive, clutch-mechanism including clutch plates and a clutch-operating member to secure forward drive, some of said clutch plates and said clutch-operating member arranged for axial movement on the hub of said internal gear, actuating-means for said operating-member slidably arranged on said driven shaft including link and lever mechanism connecting it with said operating-member, and means positively to constrain said clutch-operating member and actuating-means for simultaneous rotation for reverse drive.

4. In a reversing gearing, a driving shaft, a driven shaft, gearing connecting said shafts including an internal gear and brake-mechanism to secure reverse drive and clutch-mechanism including clutch-plates and a clutch-operating member to secure forward drive, some of said clutch plates and said operating-member arranged for sliding movement on the hub of said internal gear, actuating-means, link and lever mechanism connecting said actuating-means with said clutch-operating member, and means connecting said actuating-means with the hub of said internal gear admitting of axial movement of said actuating-means on said driven shaft.

5. In a reverse gearing, a driving shaft, a driven shaft, gearing connecting said shafts including an internal gear and brake-mechanism to secure reverse drive, and clutch-mechanism including clutch-plates and an operating member to secure forward drive, some of said plates and said operating-member slidably mounted on the hub of said internal gear, actuating-means for said operating-member slidably arranged on said driven shaft, link and lever mechanism connecting said actuating-means with said operating member, and means positively constraining said operating-member and actuating-means against rotation independent of the driven shaft, and against rotation independently of each other.

6. In a reverse gearing, a driving shaft, a driven shaft, gearing connecting said shafts including brake-mechanism to secure reverse drive and clutch-mechanism to secure forward drive, an internal gear, a clutch operating member slidably arranged on the hub of said gear, a ring adjustably mounted on the hub of said gear, and resilient means connecting said ring and operating-member admitting of an axial movement of said operating member relative to said ring.

7. In a reverse gearing, a driving shaft, a driven shaft, gearing connecting said shafts including brake-mechanism to secure reverse drive and clutch-mechanism to secure forward drive, an internal gear, a clutch-operating member slidably arranged on the hub of said gear, a ring adjustably mounted on the hub of said gear, rods connected with said operating-member slidably arranged in said ring, and springs engaging said rods and ring to move said operating-member axially.

8. In a reverse gearing, a driving-shaft, a driven-shaft, gearing connecting said shafts including an internal gear connected with the driven shaft and brake mechanism coöperating therewith to secure reverse drive, and clutch-mechanism to secure forward drive, including clutch plates, and an operating-member, some of said clutch-plates and said operating-member slidably mounted on the hub of said internal gear, actuating-means for said operating-member, link and lever mechanism connecting them, and means fixing them against rotative action independently of each other, or independently of the driven shaft, which admits of limited axial movement of the operating-member independently of the internal gear with which it is associated.

9. A reverse gearing including a driving-shaft, a driven-shaft, a spur gear connected to the driving-shaft, an internal gear connected to the driven-shaft, a case having gearing intermediate the spur gear and internal gear, brake-mechanism coöperating with the case to secure reverse drive, clutch-mechanism arranged intermediate and wholly within the case and between the case and internal gear to secure forward drive, the case having a removable wall beyond the clutch-mechanism and formed on its surface next the clutch-mechanism with an annular undercut channel.

10. In a reverse gearing, a driving-shaft, a driven-shaft, gearing connecting said shafts including brake-mechanism to secure reverse drive, a clutch-mechanism to secure forward drive, actuating-means movable in opposite directions from neutral, to operate said mechanisms, respectively, and means rigidly connected to a component part of said connecting gearing and slidably connected with one member of the actuating-means to limit movement of said actuating-means in that direction to operate the clutch-mechanism.

11. In a reverse gearing, a driving-shaft, a driven-shaft, gearing connecting said shafts including brake-mechanism to secure reverse drive, a clutch-mechanism to secure forward drive, actuating-means movable in opposite directions from neutral, to operate said mechanisms, respectively, and rods rigidly connected to a component part of said connecting gearing and slidably connected with one member of the actuating-means, to limit movement of said actuating-means in that direction to operate the clutch-mechanism.

12. In a reverse gearing, a driving-shaft, a driven-shaft, gearing connecting said shafts including brake-mechanism to secure reverse drive, a clutch-mechanism to secure forward drive, actuating-means movable in opposite directions from neutral, to operate said mechanisms, respectively, including a sliding element, and rods rigidly connected to a component part of said connecting gearing, and slidably connected with the sliding element, to limit movement of said actuating-means in that direction to operate the clutch-mechanism.

13. In a reverse gearing, a driving-shaft, a driven-shaft, gearing connecting said shafts including brake-mechanism to secure reverse drive, a clutch-mechanism to secure forward drive, actuating-means movable in opposite directions from neutral, to operate said mechanisms, respectively, including a sleeve, and rods connected at one end with a component part of the connecting gearing and at their other ends with the sleeve, to limit movement of said actuating-means in that direction to operate the clutch-mechanism, said sleeve having longitudinal recesses for the rods admitting of relative sliding movements of the sleeve with respect to the rods.

14. In a reverse gearing, a driving-shaft, a driven-shaft, gearing connecting said shafts including brake-mechanism to secure reverse drive, a clutch-mechanism to secure forward drive, actuating-means movable in opposite directions from neutral, to operate said mechanisms, respectively, and means to limit the movement of said actuating-means in that direction to operate the clutch-mechanism having adjustable means associated with it to vary such movement and determine the contact pressure of the clutch-elements.

15. In a reverse gearing, a driving-shaft, a driven-shaft, gearing connecting said shafts including brake-mechanism to secure reverse drive, a clutch-mechanism to secure forward driven, actuating-means movable in opposite directions from neutral, to operate said mechanisms, respectively, including a sleeve and rods connected at one end with a component part of the connecting gearing and at their other ends with the sleeve to limit movement of said actuating-means in that direction to operate the clutch-mechanism, said sleeve having longitudinal recesses for the rods admitting of relative sliding movements of the sleeve with respect to the rods, said rods having adjustable heads thereon by which to vary such movement and determine the contact pressure of the clutch-elements.

16. In a reversing gearing, a driving-shaft, a driven-shaft, gearing connecting said shafts including an internal gear, and brake-mechanism to secure reverse drive, a clutch-mechanism to secure forward drive, actuating-means movable in opposite directions from neutral, to operate said mechanisms, respectively, and means connecting said internal gear with said actuating-means, to limit movement of said actuating means in a direction to operate the clutch mechanism.

17. In a reversing gearing, a driving-shaft, a driven-shaft, gearing connecting said shafts including an internal gear and brake-mechanism to secure reverse drive, a clutch-mechanism to secure forward drive, actuating-means movable in opposite directions from neutral, to operate said mechanisms, respectively, means connecting said internal gear with said actuating-means, to limit movement of said actuating-means in a direction to operate the clutch-mechanism, said connecting-means admitting of movement of the actuating-means in the other direction to operate the brake-mechanism.

18. In a reversing gearing, a driving-shaft, a driven-shaft, gearing connecting said shafts including a non-axially movable internal gear, and brake-mechanism to secure reverse drive, a clutch-mechanism to secure forward drive, actuating-means movable in opposite directions from neutral to operate said mechanisms, respectively, and means connecting said internal gear with said actuating-means to limit movement of said actuating-means in a direction to operate the clutch-machnanism.

19. In a reversing gearing, a driving-shaft, a driven-shaft, gearing connecting said shafts including an internal gear and brake-mechanism to secure reverse drive, a clutch-mechanism to secure forward drive, actuating-means movable in opposite directions from neutral to operate said mechanisms, respectively, and rods connected at one end to said internal gear, and slidably connected at their other ends to one member of the actuating-means, to limit movement of said actuating-means in that direction to operate the clutch-mechanism and admit of movement of the actuating-means in the opposite direction to operate the brake-mechanism.

In testimony whereof I have signed my name to this specification in the presence of two subscribing witnesses.

HENRY A. TUTTLE.

Witnesses:
   T. T. GREENWOOD,
   H. B. DAVIS.